United States Patent Office 3,826,823
Patented July 30, 1974

3,826,823
STABILIZED PROSTAGLANDIN PREPARATIONS
Anne Cecile O'Rourke, Redwood City, and John Scott Kent, Palo Alto, Calif., assignors to Syntex (U.S.A.) Inc., Palo Alto, Calif.
No Drawing. Filed Sept. 25, 1972, Ser. No. 291,616
Int. Cl. A61k 27/00
U.S. Cl. 424—80   16 Claims

ABSTRACT OF THE DISCLOSURE

A dry, stabilized pharmaceutical preparation comprising a minor amount of a prostaglandin, particularly $PGE_2$, and a major amount of polyvinyl pyrrolidone which serves to stabilize, for extended periods of time, the chemical potency of the prostaglandin material.

FIELD OF THE INVENTION

This invention relates to dry prostaglandin preparations wherein the chemical potency of the prostaglandin material is stabilized, for extended periods of time, by forming a solid dispersion of the prostaglandin material with polyvinyl pyrrolidone.

BACKGROUND OF THE INVENTION

Prostaglandins are a group of chemically related 20-carbon chain hydroxy fatty acids having the basic skeleton of prostanoic acids:

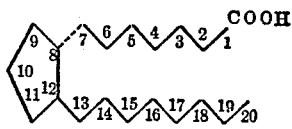

Prostanoic Acid

The prostaglandins having a hydroxy group at the C-11 position and a keto group at the C-9 position are known as the PGE series. Those having a hydroxyl group in place of the keto group at the C-9 position are known as the PGF series and are further designated by an α or β suffix to indicate the configuration of the hydroxyl group at the C-9 position. The natural compounds are the α-hydroxy substituted compounds. They may contain different degrees of unsaturation in the molecule, particularly at C-5, C-13, and C-17, the unsaturation is also indicated by a suffix. Thus, for example, $PGE_1$ referes to a prostanoic acid having a trans olefin bond at the 13-position. For a review on prostaglandins and the definition of primary prostaglandins, see, for example, S. Bergstrom, Recent Progress in Hormone Research 22, pp. 153–175(1966) and S. Bergstrom, Science 157, page 382(1967).

Using accepted nomenclature, prostaglandins of the PGE, PGF, PGA and PGB series are named as follows:

$PGE_1$: 11α,15α-dihydroxy-9-keto-13-prostenoic acid;
$PGE_2$: 11α,15α-dihydroxy-9-keto-5,13-prostadienoic acid;
$PGE_3$: 11α,15α-dihydroxy-9-keto-5,13-17-prostatrienoic acid;
$PGF_1$: 9α,11α,15α-trihydroxy-13-prostenoic acid;
$PGF_2$: 9α,11α,15α-trihydroxy-5,13-prostadienoic acid;
$PGA_1$: 15α-hydroxy-9-keto-10,15-prostadienoic acid;
$PGA_2$: 15α-hydroxy-9-keto-10,13,17-prostatrienoic acid;
$PGB_1$: 15α-hydroxy-9-keto-8,13-prostadienoic acid; and,
$PGB_2$: 15α-hydroxy-9-keto-10,13,17-prostatrienoic acid.

Prostaglandins are widely distributed in mammalian tissues and have been isolated from natural sources in very small amounts. In addition a number of the natural occurring prostaglandins have been prepared by chemical synthesis; see for example, J. Am. Chem. Soc. 91, 5675 (1969), J. Am. Chem. Soc. 92, 2586 (1970) and J. Am. Chem. Soc. 93, 1489–1493 (1971) and references cited therein, W. P. Schneider et al., J. Am. Chem. Soc. 90, 5895 (1968), U. Axen et al., Chem. Commun., 303 (1969), and W. P. Schneider, Chem. Commun. 304 (1969).

Because of the remarkable range of biological and pharmacological properties exhibited by this family of compounds, a great deal of interest has focused upon such compounds. It is known, however, that prostaglandins in general, and specifically $PGE_2$, are, from a chemical point of view, relatively unstable. See, for example, Brummer J. Pharm. Pharmac. 23, 804 (1971), and Karmin et al., European J. Pharmacol. 4, 416 (1968).

OBJECTS OF THE INVENTION

It is, therefore, the primary object of this invention to provide dry, chemically stabilized prostaglandin preparations.

It is a further object of this invention to provide dry, stabilized $PGE_2$ preparations.

It is a further object of this invention to provide dry preparations of prostaglandins which are chemically stabilized with polyvinyl pyrrolidone.

It is a further object of this invention to provide novel dry pharmaceutical preparations containing polyvinyl pyrrolidone and at least one prostaglandin material.

It is a further object of this invention to provide a process for preparing dry, stabilized prostaglandin preparations wherein the prostaglandin material is intimately and uniformly dispersed within a stabilizing quantity of polyvinyl pyrrolidone.

These and still further objects, features, and advantages of the present invention will become apparent upon consideration of the following detailed disclosure.

BRIEF SUMMARY OF THE INVENTION

The above and still further objects, features, and advantages of the present invention are achieved, in accordance therewith, by dispersing a pharmaceutically active quantity of a prostaglandin material within a stabilizing quantity of polyvinyl pyrrolidone. In a specific embodiment, for example, the combination of $PGE_2$ with polyvinyl pyrrolidone has exhibited a high degree of chemical stability after extended periods of storage at or above room temperature.

The dry, stabilized polyvinyl pyrrolidone-prostaglandin preparation of the present invention can be made by any suitable method. For example, the polyvinyl pyrrolidone and the desired prostaglandin material are dissolved in a suitable solvent, such as, for example, water, methylene dichloride or chloroform. The ratio of prostaglandin material to polyvinyl pyrrolidone can vary, depending upon the concentration of the prostaglandin desired in the final unit dosage form, but the presently preferred range is one part prostaglandin to about 10 to about 1000 parts polyvinyl pyrrolidone. With more potent prostaglandin materials, it may be desirable, or necessary, to reduce the ratio of prostaglandin to polyvinyl pyrrolidone even further, for example, to 1 part prostaglandin to about 10,000–100,000 parts polyvinyl pyrrolidone. The ratio of the combined prostaglandin-polyvinyl pyrrolidone mixture to solvent can also vary, but the presently preferred ratio is about 16 parts of prostaglandin-polyvinyl pyrrolidone mixture to about 100 parts solvent. The solution is then dried, for example, by drying in a vacuum oven at 50–

60° C. or by spray drying. Where an aqueous solvent, such as water, is utilized, the solvent may be removed by freeze-drying, care being taken, as indicated below, to remove as much water as is practical. When freeze-drying is employed, conventional pharmaceutical adjuvants (excepting those adjuvants specifically added for stabilizing and/or anti-oxidant purposes) should not be added to the aqueous solution since such additions adversely affect the stability of the freeze-dried preparation. The dry, stabilized preparation so obtained should contain about 0.1–10%, generally 1%, of the pharmaceutically active prostaglandin material with the balance being polyvinyl pyrrolidone; however, other concentrations of the prostaglandin material (for example, up to about 50% by weight prostaglandin) can be formulated if required by a particular use for the dosage form prepared from the dry, stabilized preparation of the present invention. As indicated above, the method described specifically herein is exemplary of methods for preparing the dry, stabilized prostaglandin-polyvinyl pyrrolidone preparation of the present invention. Other methods that will be apparent to one skilled in this art are equally applicable, care should be taken, however, to select a method which substantially eliminates water from the preparation so as to make it substantially anhydrous. Methods which do not substantially eliminate water are not desirable since water retention in the preparation will result in reduced activity or potency of the stabilized preparation over an extended period of time. Retention or uptake of a minimum amount of water, up to about 5%, is, for all practical purposes, unavoidable and, therefore, not undesirable. It is preferred, however, to maintain the amount of residual water at the lowest practical level and certainly at a level which does not diminish the advantages afforded by dispersion of the prostaglandin material within the polyvinyl pyrrolidone.

The present invention is applicable to the use of any naturally occurring or synthetic prostaglandin as the pharmaceutically active component of the preparations of the present invention, such as, for example, the prostaglandins specifically set forth above. However, certain of such prostaglandin materials are more stable than others and, to the extent that they are more stable, the stabilizing effect of the polyvinyl pyrrolidone may be correspondingly diminished. The combination of polyvinyl pyrrolidone and a relatively stable prostaglandin is, nonetheless, considered to be within the scope of the present invention. To the extent that the particular prostaglandin material is relatively chemically unstable, as for example is $PGE_2$, the polyvinyl pyrrolidone has been found to enhance the chemical stability of the prostaglandin material during long periods of storage at or above room temperature.

The dry preparation which is obtained according to the procedure described above is a solid dispersion of the prostaglandin material in the polyvinyl pyrrolidone. By solid dispersion, it is meant the dispersion of one or more prostaglandin materials, alone or in combination with other active components, in the polyvinyl pyrrolidone at solid state. More specific terms such as solid solution, solid suspension, solid matrix, or coprecipitate are considered to be included within the broad definition of the term solid dispersion. Either at the time of initial production of the dry preparation of the present invention, or at some time subsequent thereto, the preparation can be formulated into a variety of pharmaceutical or veterinary compositions and, as such, can be administered in a wide variety of dosage forms suitable for enteral, parenteral, or topical administration. Such compositions may have the prostaglandin material as the sole active component or it may be in combination with other pharmaceutically compatible medicaments. The preparation is, thus, typically administered as a pharmaceutical composition containing the pharmaceutically active compound(s) and/or a pharmaceutically acceptable salt thereof, the polyvinyl pyrrolidone, and one or more pharmaceutical carriers or adjuvants. The administerable pharmaceutical composition may take the form of oral or vaginal tablets, powders, capsules, pills, bougies, food premixes, or the like, preferably in unit dosage forms for simple administration of precise dosages. Suitable non-toxic solid carriers include, for example, pharmaceutical grades of mannitol, lactose, starches, magnesium stearate, sodium saccharin, talcum, sodium bisulfite, and the like. The preparation of the present invention may also be formulated into vaginal or rectal suppositories using, for example, polyalkylene glycols, as the appropriate pharmaceutical carrier. Liquid pharmaceutically administerable compositions can, for example, be prepared by dissolving, dispersing, etc. the dry preparation of the present invention in a suitable carrier, such as, for example, water, to thereby form a solution. The dry preparation of the present invention is also adapted for reconstitution at the time of use by dissolving the preparation in a pharmaceutically acceptable carrier, such as water. If desired, the pharmaceutical composition to be administered may also contain minor amounts of non-toxic auxiliary substances such as wetting or emulsifying agents, pH buffering agents, and the like, for example, sodium acetate, sorbitan monolaurate, triethanolamine oleate, etc. Actual methods of preparing such dosage forms, are known, or will be apparent, to those skilled in this art.

Prostaglandin materials are typically administered in dosages from about 0.1 to 10 mg. per kg. of body weight. The precise effective dosage will, therefore, vary depending upon the mode of administration, the condition being treated, and the host to whom the administration is being made. The dry preparation of the present invention has the particular advantage that there is wide latitude of concentration ranges of the active component(s) in the preparation which can be formulated and, for example, reconstituted at the time of administration, thereby providing an administration rate which can be selected or varied at the time of administration.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

Unless otherwise indicated, the prostaglandin-polyvinyl pyrrolidone solid dispersions of the following Examples are prepared as follows:

The desired amounts of the prostaglandin material and the polyvinyl pyrrolidone (molecular weight about 40,000; GAF Corp., New York, N.Y.) are added to the solvent material in the desired ratio of sixteen parts prostaglandin-polyvinyl pyrrolidone mixture to 100 parts methylene dichloride. The solution is dried at 50–50° C. in a vacuum oven until a dry film is obtained. The film is then pulverized to give a dry powder.

The dry, powder preparation of the present invention, or pharmaceutical compositions prepared therefrom, are subjected to chemical stability studies by storing such preparations or compositions at various temperatures (e.g., room temperature, 37° C., 45° C. and 60° C.) for extended periods of time, and, at various times during such storage, assaying the preparations or compositions for the amount of the active component which remains at that particular time.

In the data which follows, all values for chemical activity of the active component have been adjusted to 100% for the room temperature value at time zero.

EXAMPLE I

A dry powder is prepared having one percent $PGE_2$ and 99% polyvinyl pyrrolidone. The percent activity of the active component remaining after various storage times at various temperatures is given in the following table:

TABLE 1

| Time | 60° C. | 45° C. | R.T. |
|---|---|---|---|
| 0 | | | 100 |
| 2 weeks | 90 | | |
| 3 weeks | 99 | | |
| 1 month | 93 | 96 | |
| 6 weeks | 92 | 98 | |
| 2 months | 69 | | |
| 3 months | 80 | 84 | |
| 4 months | 82 | 83 | 96 |
| 5 months | 69 | 74 | |

EXAMPLE II

Example I is repeated through the 4 month assay points. With the exception of the data points at 3 and 4 months at 60° C., the percent activity for the storage times and temperatures given in Table 1 are 90% or better. The percent activity for 3 months at 60° C. is 70%, and for 4 months at 60° C. is 82%.

EXAMPLE III

A powder preparation having 1% $PGE_2$ and 99% polyvinyl pyrrolidone is prepared. After 5 months storage at room temperature, the $PGE_2$ assays an activity of 100% of the activity at time zero.

EXAMPLE IV

A dry powder is prepared having 10% $PGE_2$ and 90% polyvinyl pyrrolidone. The percent activity of the active component remaining after various storage times at various temperatures is given in the following table:

TABLE 2

| | 37° C. | R.T. |
|---|---|---|
| Time (months): | | |
| 0 | | 100 |
| 1 | | 116 |
| 2 | 107 | 107 |
| 3 | 92 | 98 |
| 5 | 94 | 103 |

EXAMPLE V

A batch of tablets is prepared having the following composition per tablet:

| | Mg. |
|---|---|
| $PGE_2$-PVP (1:100) | 60.0 |
| Primogel | 14.4 |
| Calcium stearate | 7.2 |
| Mannitol | 218.4 |
| | 300.0 |

After storage at room temperature for 8 months, the tablets assay at 100% $PGE_2$ activity.

EXAMPLE VI

A batch of tablets is prepared having the following composition per tablet:

| | Mg. |
|---|---|
| $PGE_2$ | 0.348 |
| Polyvinyl pyrrolidone | 39.616 |
| Avicel Ph 102 | 40.0 |
| Calcium stearate | 4.8 |
| Mannitol | 115.2 |
| | 200.0 |

After storage at 37° C., room temperature and 4° C. for 6 months, the tablets for each storage temperature assay at 100% $PGE_2$ activity.

By comparison, 1 mg. $PGE_2$ and 1 ml. polyethylene glycol 400 assays 54% $PGE_2$ activity after storage for two months at 45° C.; 0.2 mg. $PGE_2$ in 2.7598 g. polyethylene glycol 4,000 assays 70% $PGE_2$ activity after storage for 6 months at room temperature and 72% $PGE_2$ activity after storage for 3 months at 45° C.; a suppository of 0.2 mg. $PGE_2$ in 2.7298 g. base comprising 2% polyethylene glycol 4,000 and 98% polyethylene glycol 1,000 assays 62% $PGE_2$ activity after storage for six months at room temperature; 0.002 g. $PGE_2$ in 20.0 g. petrolatum assays 16% $PGE_2$ activity after storage for 2 months at room temperature; 100 mcg. $PGE_2$ in 250 mg. lactose assays 49% $PGE_2$ activity after storage for 1 week at room temperature; and 0.435 mg. $PGE_2$ in 1.0 ml. ethanol assays 31% $PGE_2$ activity after storage for six months at room temperature.

It can thus be seen that the solid dispersion of a prostaglandin material, particularly $PGE_2$, within polyvinyl pyrrolidone and the treatment thereof to give a dry preparation stabilizes, for extended periods of time, the chemical potency of the prostaglandin material.

For a discussion of the significance of the data presented herein, and the extrapolation thereof to shelf-lives at room temperature, reference should be made, for example, to Kennon, "Use of Models in Determining Chemical Pharmaceutical Stability," J. of Pharm. Sciences, 53, 815–818 (July 1964).

EXAMPLE VII

Dry preparations are prepared containing 1% $PGE_1$–99% polyvinyl pyrrolidone and 10% $PGE_1$–90% polyvinyl pyrrolidone, respectively.

EXAMPLE VIII

Dry preparations are prepared containing 1% $PGE_3$–99% polyvinyl pyrrolidone and 10% $PGE_3$–90% polyvinyl pyrrolidone, respectively.

EXAMPLE IX

Dry preparations are prepared containing 1% $PGF_1$–99% polyvinyl pyrrolidone and 10% $PGF_1$–90% polyvinyl pyrrolidone, respectively.

EXAMPLE X

Dry preparations are prepared containing 1% $PGF_2$–99% polyvinyl pyrrolidone and 10% $PGF_2$–90% polyvinyl pyrrolidone, respectively.

EXAMPLE XI

Dry preparations are prepared containing 1% $PGA_1$–99% polyvinyl pyrrolidone and 10% $PGA_1$–90% polyvinyl pyrrolidone, respectively.

EXAMPLE XII

Dry preparations are prepared containing 1% $PGA_2$–99% polyvinyl pyrrolidone and 10% $PGA_2$–90% polyvinyl pyrrolidone, respectively.

EXAMPLE XIII

Dry preparations are prepared containing 1% $PGB_1$–99% polyvinyl pyrrolidone and 10% $PGB_1$–90% polyvinyl pyrrolidone, respectively.

EXAMPLE XIV

Dry preparations are prepared containing 1% $PGB_2$–99% polyvinyl pyrrolidone and 10% $PGB_2$–90% polyvinyl pyrrolidone, respectively.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. A substantially anhydrous pharmaceutical preparation comprising a solid dispersion of a prostaglandin material within polyvinyl pyrrolidone.

2. The pharmaceutical preparation of claim 1 wherein there is a minor amount of said prostaglandin material and a major amount of polyvinyl pyrrolidone.

3. The pharmaceutical preparation of claim 1 wherein there is about 0.1% to about 50% of said prostaglandin material and about 50% to about 99.9% polyvinyl pyrrolidone.

4. The pharmaceutical preparation of claim 1 wherein there is about 0.1% to about 10% prostaglandin material and about 90% to about 99.9% polyvinyl pyrrolidone.

5. The pharmaceutical preparation of claim 1 wherein said prostaglandin material is selected from the group consisting of $PGA_1$, $PGA_2$, $PGB_1$, $PGB_2$, $PGE_1$, $PGE_2$, $PGE_3$, $PGF_1$, and $PGF_2$.

6. The pharmaceutical preparation of claim 1 wherein said preparation contains 0-5% water.

7. A substantially anhydrous, stabilized pharmaceutical preparation comprising a solid dispersion of $PGE_2$ and a stabilizing amount of polyvinyl pyrrolidone, said polyvinyl pyrrolidone stabilizing the chemical activity of said $PGE_2$ when said preparation is stored for extended periods of time.

8. The stabilized pharmaceutical preparation of claim 7 containing a minor amount of said $PGE_2$ and a major amount of said polyvinyl pyrrolidone.

9. The stabilized pharmaceutical preparation of claim 7 wherein said preparation contains about 0.1% to about 10% $PGE_2$, and about 90% to about 99.9% polyvinyl pyrrolidone.

10. A method for preparing a substantially anhydrous pharmaceutical preparation comprising dissolving a mixture of a prostaglandin material and polyvinyl pyrrolidone in a solvent material therefor and removing said solvent to afford a substantially anhydrous material comprising a solid dispersion of said prostaglandin material in said polyvinyl pyrrolidone.

11. The method of claim 10 wherein said preparation contains a minor amount of said prostaglandin material and a major amount of said polyvinyl pyrrolidone.

12. The method of claim 10 wherein said prostaglandin is selected from the group consisting of $PGA_1$, $PGA_2$, $PGB_1$, $PGB_2$, $PGE_1$, $PGE_2$, $PGE_3$, $PGF_1$ and $PGF_2$.

13. The method of claim 10 wherein said prostaglandin material is $PGE_2$, said polyvinyl pyrrolidone serving to stabilize the chemical potency of said $PGE_2$ when said preparation is stored for extended periods of time.

14. The method of claim 10 further including the step of pulverizing said substantially anhydrous material to the powdered state.

15. The method of claim 10 wherein said prostaglandin material and said polyvinyl pyrrolidone are dissolved in a non-aqueous solvent.

16. The method of claim 10 wherein said prostaglandin material and said polyvinyl pyrrolidone are dissolved in an aqueous solvent.

References Cited

UNITED STATES PATENTS

| | | | |
|---|---|---|---|
| 3,553,313 | 1/1971 | Tort | 424—31 |
| 3,089,818 | 12/1972 | Stone | 424—80 |

OTHER REFERENCES

Brummer, J. Pharm. Pharmac. Vol. 23, pages 804 and 805 (1971).

SAM ROSEN, Primary Examiner

U.S. Cl. X.R.

424—305, 318

UNITED STATES PATENT OFFICE
CERTIFICATE OF CORRECTION

Patent No. 3,826,823          Dated September 25, 1972

Inventor(s) ANNE C. O'ROURKE et al

It is certified that error appears in the above-identified patent and that said Letters Patent are hereby corrected as shown below:

Column 2, line 16, change "Karmin" to --Karim--.

Column 4, line 56, change "50-50°C" to --50-60°C--.

Column 5, line 74, change "activty" to --activity--.

Signed and sealed this 29th day of April 1975.

(SEAL)
Attest:

RUTH C. MASON
Attesting Officer

C. MARSHALL DANN
Commissioner of Patents
and Trademarks